United States Patent
Li (10) Patent No.: US 12,159,561 B2
(45) Date of Patent: Dec. 3, 2024

(54) METHOD FOR CONTROLLING DISPLAY DEVICE OF VEHICLE, MEDIUM AND DISPLAY DEVICE

(71) Applicant: XIAOMI EV TECHNOLOGY CO., LTD., Beijing (CN)

(72) Inventor: Liangji Li, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/216,907

(22) Filed: Jun. 30, 2023

(65) Prior Publication Data

US 2024/0321153 A1    Sep. 26, 2024

(30) Foreign Application Priority Data

Mar. 20, 2023   (CN) .......................... 202310281432.3

(51) Int. Cl.
  *G09G 3/00*       (2006.01)
  *G09G 3/20*       (2006.01)
(52) U.S. Cl.
  CPC .............. *G09G 3/002* (2013.01); *G09G 3/20* (2013.01); *G09G 2320/06* (2013.01);
  (Continued)
(58) Field of Classification Search
  CPC .... B60K 35/23; B60K 35/231; B60K 35/232; B60K 35/233; B60K 35/234; B60K 35/235; B60K 2360/334; B60K 35/81; B60K 35/80; B60K 35/22; G02B 27/01; G09G 2380/10; G09G 2320/0686; G09G 3/002;
  (Continued)

(56) References Cited

U.S. PATENT DOCUMENTS 10,720,054 B2 *  7/2020  Kukimoto ............ B60K 35/654
10,723,264 B2 *  7/2020  Fujisawa .............. B62D 15/025
(Continued)

FOREIGN PATENT DOCUMENTS

CN         112861638  A       5/2021
EP          4089467  A1     11/2022
(Continued)

OTHER PUBLICATIONS

European Patent Application No. 23184443.2, Search and Opinion dated Jan. 24, 2024, 9 pages.
(Continued)

*Primary Examiner* — Michael J Jansen, II
(74) *Attorney, Agent, or Firm* — Cozen O'Connor (57) ABSTRACT

A method for controlling a display device of a vehicle is disclosed. The display device is configured to acquire data information sent by an external terminal by communicating with the external terminal. The method includes: acquiring a driving parameter collected by the vehicle; determining a target display mode and a target display content based on the driving parameter, wherein the target display mode comprises at least one of a projection display mode or a screen display mode; and displaying the target display content based on the target display mode. The method may also include determining a current driving scenario type of the vehicle or determining a target priority of the target display content.

17 Claims, 2 Drawing Sheets

(52) U.S. Cl.
CPC ... *G09G 2360/144* (2013.01); *G09G 2370/00* (2013.01); *G09G 2380/10* (2013.01)

(58) Field of Classification Search
CPC ............... G09G 3/20; G09G 2320/06; G09G 2360/144; G09G 2370/00
See application file for complete search history.

(56) References Cited

U.S. PATENT DOCUMENTS

| | | | | |
|---|---|---|---|---|
| 10,810,966 | B1* | 10/2020 | Landgraf | B60R 1/27 |
| 11,547,361 | B2* | 1/2023 | Kusanagi | G09G 3/002 |
| 11,682,357 | B1* | 6/2023 | Seo | B60K 35/00 345/694 |
| 11,830,455 | B2* | 11/2023 | Schriever | G06F 3/16 |
| 11,840,176 | B2* | 12/2023 | Pedersen | G08G 1/0116 |
| 11,904,691 | B2* | 2/2024 | Shibata | B60K 35/81 |
| 11,999,296 | B2* | 6/2024 | Pedersen | G08G 1/012 |
| 2018/0059773 | A1* | 3/2018 | Park | G02B 27/01 |
| 2018/0086346 | A1* | 3/2018 | Fujisawa | B60W 50/14 |
| 2018/0172993 | A1* | 6/2018 | Nill | G02B 27/0149 |
| 2019/0251840 | A1* | 8/2019 | Kukimoto | B60K 35/29 |
| 2021/0393206 | A1* | 12/2021 | Kusanagi | G06F 3/14 |
| 2022/0072958 | A1* | 3/2022 | Shibata | B60K 35/81 |
| 2022/0355733 | A1* | 11/2022 | Pedersen | H04R 1/406 |
| 2023/0046484 | A1* | 2/2023 | Fang | B60K 35/00 |
| 2023/0072526 | A1* | 3/2023 | Schriever | B60K 35/80 |
| 2023/0359419 | A1* | 11/2023 | Khoo | B60K 35/00 |
| 2024/0116440 | A1* | 4/2024 | Pedersen | G08G 1/166 |

FOREIGN PATENT DOCUMENTS

| | | |
|---|---|---|
| JP | 2015143970 A | 8/2015 |
| JP | 2019064317 A | 4/2019 |

OTHER PUBLICATIONS

Japanese Patent Application No. 2023-190136, Office Action dated Aug. 20, 2024, 10 pages.
Japanese Patent Application No. 2023-190136, English translation of Office Action dated Aug. 20, 2024, 10 pages.

* cited by examiner

METHOD FOR CONTROLLING DISPLAY DEVICE OF VEHICLE, MEDIUM AND DISPLAY DEVICE

CROSS REFERENCE TO RELATED APPLICATIONS

This application claims priority to Chinese Patent Application No. 202310281432.3, filed on Mar. 20, 2023, the content of which is incorporated herein by reference in its entirety.

TECHNICAL FIELD

The present disclosure relates to a field of vehicle technologies, and specifically to a method for controlling a display device of a vehicle, a medium and a display device.

BACKGROUND

In the related art, the operational state information of a vehicle, such as speed, is generally displayed on an instrument panel of the vehicle. When operating the vehicle, a driver typically is required to look down to view parameters such as a vehicle speed in a driving process. This causes the driver to look away from the road and surroundings, and may lead to a driving safety problem.

SUMMARY

According to a first aspect of the present disclosure, a method for controlling a display device of a vehicle is provided, in which the display device is configured to acquire data information sent by an external terminal by communicating with the external terminal. The method includes:
acquiring a driving parameter collected by the vehicle;
determining a target display mode and a target display content based on the driving
parameter, in which the target display mode includes at least one of the projection display mode and the screen display mode; and
displaying the target display content based on the target display mode.

Optionally, determining the target display mode and the target display content based on the current driving parameter includes:
determining a current driving scenario type of the vehicle based on the driving parameter; and
determining the target display mode and the target display content based on the current driving scenario type.

Optionally, the driving parameter includes light intensity information, in which determining the current driving scenario type of the vehicle based on the driving parameter includes:
in response to the light intensity information meeting a preset condition, determining that the current driving scenario type of the vehicle is a first driving scenario, in which the preset condition includes a difference value between a light intensity of a first region of the vehicle and a light intensity of a second region of the vehicle being greater than a first preset threshold; and
determining the target display mode and the target display content based on the current driving scenario type includes:
in response to the current driving scenario type being the first driving scenario, determining the screen display mode as the target display mode, and determining a first display content as the target display content, in which the first display content includes a road condition image collected by the vehicle.

Optionally, the driving parameter includes obstacle information, in which determining the current driving scenario type of the vehicle based on the driving parameter includes:
in response to the obstacle information representing that a number of obstacles is greater than a second preset threshold, determining that the current driving scenario type of the vehicle is a second driving scenario; and
determining the target display mode and the target display content based on the current driving scenario type includes:
in response to the driving scenario type being the second driving scenario, determining the screen display mode as the target display mode, and determining a second display content as the target display content, in which the second display content includes the obstacle information collected by the vehicle.

Optionally, determining the target display mode and the target display content based on the current driving scenario type includes:
in response to the current driving scenario type representing that the vehicle is located in a highway driving scenario and a number of obstacles is less than a third preset threshold, determining the projection display mode as the target display mode, and determining a third display content as the target display content, in which the third display content includes driving assistance information for alleviating driving fatigue.

Optionally, determining the target display mode and the target display content based on the current driving scenario type includes:
in response to the current driving scenario type representing that a speed of the vehicle is less than or equal to a preset speed threshold, determining the screen display mode as the target display mode, and determining a fourth display content as the target display content, in which the fourth display content includes an audio and video content.

Optionally, displaying the target display content based on the target display mode includes:
displaying the audio and video content based on the projection display mode and a target play progress of the audio and video content, in which the target play progress is a progress when the audio and video content stopped playing last time.

Optionally, displaying the target display content based on the target display mode includes:
in response to the target display mode being the screen display mode, determining a target priority corresponding to the target display content;
in response to the target priority being greater than or equal to a preset priority, controlling a display screen of the display device to display the target display content; and
in response to the target priority being less than the preset priority, sending the target display content to a central control screen of the vehicle and displaying the target display content on the central control screen.

Optionally, the display device includes a plurality of display screens, in which in response to the target priority being greater than or equal to the preset priority, controlling the display screen of the display device to display the target display content includes:

in response to the target priority being greater than or equal to the preset priority, detecting position information of the plurality of display screens;

determining a target display screen based on the position information and the target priority, in which the target display screen is a display screen with a screen priority consistent with the target priority in the plurality of display screens, and a size of the screen priority is negatively correlated with a distance between the target display screen and a driver cabin; and displaying the target display content on the target display screen.

According to a second aspect of the present disclosure, a computer-readable storage medium with a computer program instruction stored thereon is provided, in which the program instruction implements steps in the method for controlling the display device of the vehicle according to the first aspect of the present disclosure when executed by a processor.

According to a third aspect of the present disclosure, a display device of a vehicle is provided. The display device includes:

a projection device configured to provide a projection display mode;

a display screen configured to provide a screen display mode;

a communicator configured to communicate with an external terminal and acquire data information sent by the external terminal;

a memory configured to store instructions executable by a controller; and the controller, configured to: acquire a driving parameter collected by the vehicle; determine a target display mode and a target display content based on the driving parameter, wherein the target display mode comprises at least one of a projection display mode or a screen display mode; and control a display of the target display content based on the target display mode.

The technical solution according to the embodiments of the present disclosure may include the following beneficial effects: a driving parameter collected by the vehicle is acquired, a target display mode and a target display content are determined based on the driving parameter, and the target display content is displayed based on the target display mode. In this way, the display device of the vehicle according to the embodiments of the present disclosure may be dynamically switched between a projection display mode and a screen display mode based on a driving state of the vehicle, and a display content may be dynamically adjusted based on the driving state of the vehicle, so that the driver may not only view vehicle information without a need of looking down at the central control panel or the instrument panel, but also assist the driver to drive the vehicle better by dynamically adjusting the display mode and the display content, thus improving the driving safety of the vehicle.

It should be noted that, the above general description and the following details are exemplary and explanatory, and do not constitute the limitation on the present disclosure.

BRIEF DESCRIPTION OF THE DRAWINGS

The drawings herein are incorporated into the specification and constitute a part of the specification, show embodiments in conformity with the embodiments of the present disclosure, and explain the principle of the present disclosure together with the specification.

DETAILED DESCRIPTION

The exemplary embodiments will be described in detail here, examples of which are shown in the accompanying drawings. When the following descriptions refer to the accompanying drawings, same numbers in different drawings represent same or similar elements unless otherwise indicated. The implementations described in the following exemplary embodiments do not represent all implementations consistent with the present disclosure. Rather, they are merely examples of apparatuses and methods consistent with some aspects of the disclosure as detailed in the appended claims.

It should be noted that, all actions of acquiring signals, information or data in the present disclosure are performed on the premise of conforming to data protection laws and regulations corresponding to a country of residence, and obtaining a permission from an owner of a corresponding apparatus.

Figure 1:
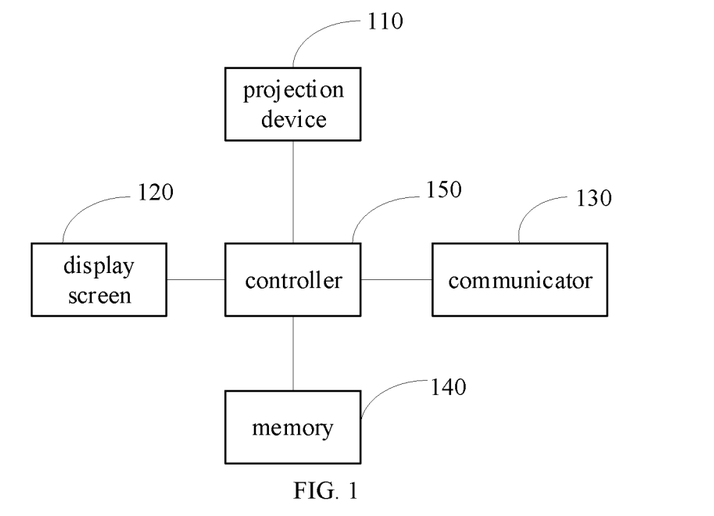
FIG. 1 is a structural diagram illustrating a display device of a vehicle according to an exemplary embodiment.

FIG. 1 is a diagram illustrating a display device of a vehicle according to an exemplary embodiment. As illustrated in FIG. 1, the display device according to the embodiments of the present disclosure includes a projection device 110, a display screen 120, a communicator 130, a memory 140 and a controller 150. The projection device 110, the display screen 120, the communicator 130 and the memory 140 are respectively connected to the controller 150.

Figure 5:
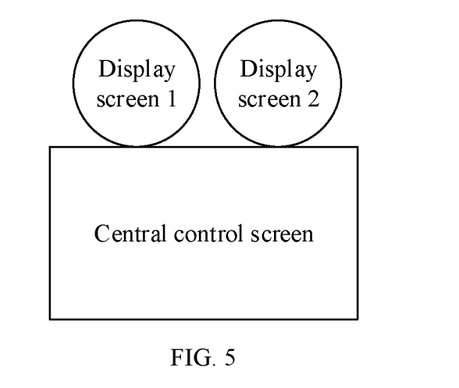
FIG. 5 is a structural diagram illustrating a relative position between the display screen in the display device and a central control screen according to an exemplary embodiment.

The projection device 110 may be provided/installed on a body of a display device and configured to provide a projection display mode. For example, the projection device 110 may be set towards a front windshield to project a display content on the front windshield of the vehicle. The display screen 120 may be provided on the body of the display device. The display screen 120 may be fixedly provided on the body of the display device, or the display screen 120 may be detachably connected to the body of the display device. The display screen 120 may be set in a way of facing the driver so that the driver may view a display content on the display screen 120. For example, the display screen 120 may be a liquid crystal display (LCD) or a light emitting diode (LED), etc. In an embodiment of the disclosure, the display device may also include a central control screen, and the display screen 120 may be set above the central control screen. For example, as shown in FIG. 5, a plurality of display screens are located above the central control screen.

The communicator 130 is configured to communicate with an external terminal to acquire data information sent by the external terminal. The external terminal may be a mobile terminal, such as a smart phone, a tablet computer. The external terminal may also be a vehicle. The display device may connect with a mobile terminal in the vehicle and/or a central control screen of the vehicle in a local area network (LAN) via the communicator 130. The communicator 130 may be a Wi-Fi® module, a Bluetooth® module, etc. The communicator 130 may also be a data port which is connected to the controller 150, for connecting with the vehicle via a wire. For example, the data port may be a bus communication port, and the data port may be connected to a port in the central control of the vehicle via the wire to acquire data information collected by the vehicle.

It is worth noting that the display device may include a fixing member, so that the body of the display device is fixed on the central control screen of the vehicle by the fixing member. For example, the fixing member may include a first magnetic part and a fixing part. The first magnetic part is configured to attract to and align with a second magnetic part provided on the vehicle, and the fixing part is configured to fix the body of the display device on the vehicle by means of a fastener. The fastener may be a bolt, a rivet, that is, the body of the display device may be connected to the vehicle via the bolt or the rivet. The fixing part may also other fixing parts, such as clasps.

In addition, the display device may include a power supply module, and the power supply module includes a battery and a power supply port. The power supply port is connected to the battery, and is configured to be connected to a voltage output port of the vehicle.

Figure 2:
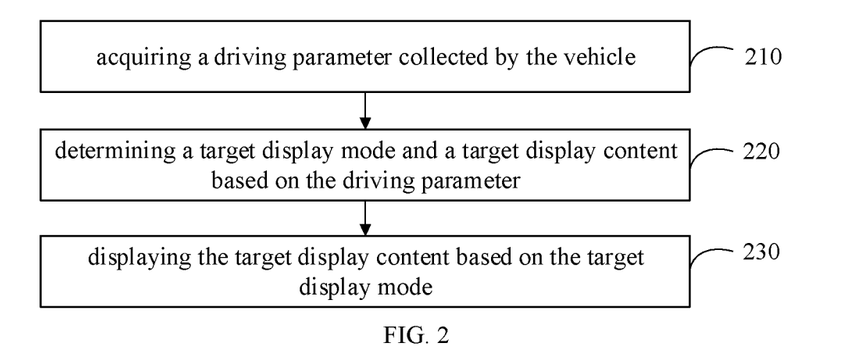
FIG. 2 is a flowchart illustrating a method for controlling a display device of a vehicle according to an exemplary embodiment.

FIG. 2 is a flowchart illustrating a method for controlling a display device of a vehicle according to an exemplary embodiment. As illustrated in FIG. 2, the control method is applicable to the display device as illustrated in FIG. 1, and includes the following steps.

At step 210, a driving parameter collected by the vehicle is acquired.

The driving parameter may include vehicle speed information, vehicle position information, obstacle information, light intensity information, etc. The vehicle speed information may refer to a vehicle speed obtained by a speed sensor set on the vehicle in a real-time test of the vehicle. The vehicle position information may refer to current position information of the vehicle, and the vehicle position information may be acquired by a positioning module of the vehicle. The positioning module may be a global positioning system (GPS) or a BeiDou® navigation satellite system. The vehicle position information may be used to determine a type of a road where the vehicle is currently located, such as a highway, an urban road, a country road. The obstacle information may be a type and a number of obstacles around the vehicle, for example, a number of other vehicles, a number of non-motor vehicles, a number of pedestrians. The obstacle information may be determined based on point cloud data acquired by a LIDAR set on the vehicle and/or a captured image acquired by a camera device. The light intensity information is illumination information of light emitting on the vehicle, and may be acquired by an illumination sensor provided on the vehicle. It may be determined whether the vehicle is in a glare scenario based on the light intensity information. For example, when the vehicle is driving at night, and the oncoming vehicle turns on a high beam, it may be determined that the vehicle is in the glare scenario based on the light intensity information detected by the illumination sensor.

It is worth stating that the display device may acquire the driving parameter collected by the vehicle via a communication connection with the vehicle. The display device may also acquire the driving parameter collected by the vehicle by means of a communication connection with a mobile terminal. The mobile terminal is communicatively connected to the vehicle, to acquire the driving parameter collected by the vehicle, and send the driving parameter to the display device.

At step 220, the target display mode and the target display content are determined based on the driving parameter.

Optionally, different driving parameters may correspond to different target display modes and different target display contents. The target display mode includes one or more of a projection display mode and a screen display mode. The target display content may include one or more of an audio and video content, a vehicle state parameter, a road condition image, driving assistance information and obstacle information.

At step 230, the target display content is displayed based on the target display mode.

The display device displays the target display content in the target display mode. When the target display mode is the projection display mode and the target display content is the vehicle state parameter, the display device controls the projection device to project the vehicle state parameter. When the target display mode is the screen display mode and the target display content is the road condition image, the display device controls the display screen to display the road condition image. When the target display mode is the projection display mode and the screen display mode, and the target display content is the audio and video content, the display device controls the projection device to project the audio and video content and controls the display screen to display the audio and video content.

Thus, the driving parameter collected by the vehicle is acquired, the target display mode and the target display content are determined based on the driving parameter, and the target display content is displayed based on the target display mode, so that the display device of the vehicle according to the embodiments of the present disclosure may be dynamically switched between a projection display mode and a screen display mode based on a driving state of the vehicle, and a display content may be dynamically adjusted based on the driving state of the vehicle. In this way, the driver may not only view vehicle information without a need of looking down at the central control panel or the instrument panel, but also assist the driver in driving the vehicle better by dynamically adjusting the display mode and the display content, thus improving the driving safety of the vehicle.

Figure 3:
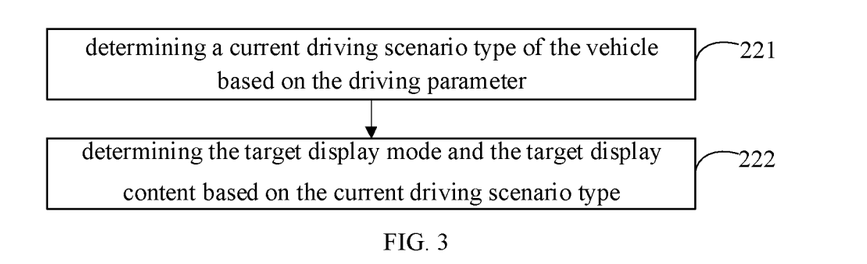
FIG. 3 is a detailed flowchart of step 220 as illustrated in FIG. 2.

FIG. 3 is a detailed flowchart of step 220 as illustrated in FIG. 2. As illustrated in FIG. 3, step 220 may include the following steps.

At step 221, a current driving scenario type of the vehicle is determined based on the driving parameter.

The driving scenario type where the vehicle is currently located may be different based on different driving parameters. For example, when the vehicle position information represents that the vehicle is in a highway, the current driving scenario type of the vehicle is a highway scenario. When the light intensity information is greater than a preset light intensity, the current driving scenario type of the vehicle is a glare scenario. When the obstacle information represents that a number of obstacles is greater than a second preset threshold, it represents that the current driving scenario type of the vehicle is a complex road condition scenario.

At step 222, the target display mode and the target display content are determined based on the current driving scenario type.

The target display mode and the target display content may be different based on different driving scenario types.

The target display mode and the target display content corresponding to the current driving scenario type of the vehicle may be determined based on a mapping relationship between driving scenario types, and target display modes and target display contents.

Thus, a driving scenario type where the vehicle is currently located is determined based on the driving parameter, the target display mode and the target display content of the display device are determined based on the driving scenario type, which may assist the driver in driving the vehicle better by dynamically adjusting the display mode and the display content based on different driving scenario types of the vehicle, and improves the driving safety of the vehicle. For example, when the driving scenario type represents a complex road condition, the display device may display the target display content through a screen display mode, to avoid that the target display content in a projection display affects a line of sight of the driver. When the driving scenario type represents that a road condition safety level is a preset level, the display device may be switched to a projection display mode, and project the target display content on a front windshield in the projection display mode, so that the driver may directly view the target display content without lowering his/her head.

In some implementations, when the light intensity information meets a preset condition, it is determined that the current driving scenario type of the vehicle is a first driving scenario. The preset condition includes a difference value between a light intensity of a first region of the vehicle and a light intensity of a second region of the vehicle being greater than a first preset threshold. When the driving scenario type is the first driving scenario, the screen display mode is determined as the target display mode, and a first display content is determined as the target display content. The first display content includes a road condition image collected by the vehicle.

The light intensity information may include the light intensity of the first region of the vehicle and the light intensity of the second region. The vehicle may acquire the light intensity of the first region and the light intensity of the second region by the illumination sensor set in the first region and the second region. The first region and the second region may refer to both sides of the front windshield of the vehicle.

When a difference value between the light intensity of the first region of the vehicle and the light intensity of the second region of the vehicle is greater than the first preset threshold, it indicates that the driver of the vehicle is exposed to strong light. In an example, when the vehicle is driving at night, and the oncoming vehicle turns on a high beam, a light intensity at the driver position may be greater than that at the co-driver position. In this case, the driving scenario type of the vehicle is the first driving scenario. The first driving scenario represents that the vehicle is in the glare scenario.

It should be understood that, the first preset threshold may be a light intensity value representing that the vehicle is located in the glare scenario, which is set according to the actual situation. The first preset threshold may be configured according to the actual situation.

When the driving scenario type is the first driving scenario, the display device may determine the screen display mode as the target display mode, and determine the first display content as the target display content. The first display content includes the road condition image collected by the vehicle.

It is worth noting that the road condition image collected by the vehicle may be a road condition image around the vehicle or a road condition image of the road in front of the vehicle, acquired by an image acquisition device. The image acquisition device may be a camera device, such as a visible light camera device, an infrared camera device, or may be a radar, such as a LIDAR, a millimeter wave radar.

When the driving scenario type is the first driving scene, the display device may display a road condition image collected by the vehicle on the display screen, so that the driver may assist in driving through the road condition image displayed on the display screen when the driver cannot see the road condition clearly in the glare scenario.

It should be understood that, when the driving scenario type is the first driving scenario, the display device may turn off the projection display mode to avoid unnecessary interferences on the driver. In the first driving scenario, the road condition image cannot be seen clearly even if it is projected on the front windshield due to the influence of a glare light source.

The first display content may further include other necessary display contents such as a speed, a revolutions per minute (RPM), a fuel capacity, an electric quantity, in addition to the road condition image.

Thus, when the driving scenario type is the first driving scenario, it is possible to assist the driver in safe driving in a glare environment by switching to the screen display mode and displaying the road condition images collected by the vehicle.

In some implementations, when the obstacle information represents that a number of obstacles is greater than a second preset threshold, it is determined that the current driving scenario type of the vehicle is a second driving scenario. When the driving scenario type is the second driving scenario, it is determined that the screen display mode is the target display mode, and a second display content is the target display content. The second display content includes the obstacle information collected by the vehicle.

The obstacle information represents that the number of obstacles is greater than the second preset threshold, which may be a number of obstacles detected around the vehicle or on the road in front of the vehicle. When the obstacle information represents that the number of obstacles is greater than the second preset threshold, it is determined that the current driving scenario type of the vehicle is the second driving scenario. The second preset threshold may be configured according to the actual situation.

It should be understood that, the second driving scenario may refer to that the vehicle is in a complex road situation, and the environment around the vehicle is very likely to form a potential danger to the vehicle. For example, the vehicle passes through a crowd gathering area, or the vehicle is in a traffic jam road, it may be understood that the current driving scenario type of the vehicle is the second driving scenario.

When the driving scenario type is the second first driving scenario, the display device may determine the screen display mode as the target display mode, and the second display content as the target display content. The second display content includes the obstacle information collected by the vehicle.

It is worth noting that, when the driving scenario type is the second driving scenario, the display device may display the obstacle information on the display screen, to assist the driver in identifying the obstacle through the obstacle information displayed on the display screen to avoid the obstacle. The obstacle information displayed on the display screen may be a shape of the obstacle, a type of the obstacle, and a distance between the vehicle and the obstacle.

The second display content may further include other necessary display content such as a speed, a RPM, a fuel capacity, an electric quantity, in addition to the obstacle information.

Thus, when the driving scenario type is the second driving scenario, the driver is enabled to assist in identifying the obstacle based on the obstacle information displayed on the display screen by switching to the screen display mode and displaying the obstacle information, to avoid the obstacle and greatly improve the driving safety.

In some implementations, when the driving scenario type represents that the vehicle is located in a highway driving scenario and a number of obstacles is less than a third preset threshold, the projection display mode is determined as the target display mode, and a third display content is determined as the target display content. The third display content includes driving assistance information.

Whether the vehicle is in a highway driving scenario may be determined based on the vehicle position information. For example, whether the vehicle is driving in the highway is determined based on the vehicle position information. When the vehicle is driving in the highway, the vehicle is located in a highway driving scenario. Whether the number of obstacles is less than the third predetermined threshold may be determined based on the obstacle information collected by the vehicle.

It should be understood that, when the driving scenario type represents that the vehicle is in the highway driving scenario and the number of obstacles is less than the third predetermined threshold, it indicates that the vehicle is in the highway driving scenario, and the driving environment where the vehicle is located has a less potential danger on the vehicle.

In order to further enhance the driving safety, the display device may further acquire weather information collected by the vehicle, to further determine a size of a potential danger formed on the vehicle by the driving environment where the vehicle is located based on the weather information. For example, rain and snow days indicate that the driving environment where the vehicle is located has a large potential danger on the vehicle, and sunny days indicate that the driving environment where the vehicle is located has a small potential danger on the vehicle.

The third preset threshold is less than the second preset threshold, and the third preset threshold may be set based on an actual use situation.

When the driving scenario type represents that the vehicle is in the highway driving scenario and the number of obstacles is less than the third preset threshold, it indicates that the driving environment where the vehicle is located has a small potential danger on the vehicle, and the driver is prone to driving fatigue. In this case, the display device may determine the projection display mode as the target display mode, and the third display content as the target display content.

The third display content includes driving assistance information for alleviating driving fatigue. The driving assistance information is a display content for alleviating driving fatigue of the driver. For example, the driving assistance information may be a dynamic map, route planning, or other images that may improve a blink rate.

It is worth noting that, when the driving scenario type represents that the vehicle is in the highway driving scenario and the number of obstacles is less than the third predetermined threshold, the display device may project the driving assistance information through the projection device, so that the driver may alleviate the driving fatigue based on the driving assistance information and help the driver improve attention in the highway driving scenario.

The third display content may further include other necessary display content such as a speed, a RPM, a fuel capacity, an electric quantity, in addition to the driving assistance information.

Thus, when the driving scenario type represents that the vehicle is in the highway driving scenario and the number of obstacles is less than the third predetermined threshold, the driver may help the driver improve the attention based on the obstacle information projected by the projection device, by switching to the project display mode and displaying the driving assistance information, thus greatly enhancing the driving safety.

In some implementations, when the driving scenario type represents that a speed of the vehicle is less than or equal to a preset speed threshold, the screen display mode is determined as the target display mode, and a fourth display content is determined as the target display content. The fourth display content includes an audio and video content.

The driving scenario type representing that the speed of the vehicle is less than or equal to the preset speed threshold, may mean that the vehicle is in a parking scenario. The parking scenario may refer to that the vehicle may be in a shutdown state (which may be a flameout state), or the vehicle may be in a parking state (where the vehicle stops and waits for traffic lights for example).

For example, whether the vehicle is in the parking scenario may be determined based on the vehicle speed information of the vehicle. When the vehicle speed information is equal to 0, it indicates that the vehicle is in the parking scenario. When the vehicle speed information is greater than 0, it indicates that the vehicle is not in the parking scenario. In some implementations, whether the vehicle is in the parking scenario may be determined based on whether a parking brake (a handbrake) of the vehicle is enabled. For example, when the parking brake of the vehicle is enabled, it is determined that the vehicle is in the parking scenario, and when the parking brake of the vehicle is not enabled, it is determined that the vehicle is not in the parking scenario.

The driving scenario type representing that the speed of the vehicle is less than or equal to the preset speed threshold, may mean that the vehicle is in a low speed driving scenario. In some implementations, when the speed information is less than or equal to the preset speed threshold, it is determined that the vehicle is in the low speed driving scenario. For example, when the speed of the vehicle is less than or equal to 10 km/h, it is determined that the vehicle is in the low speed driving scenario. A specific value of the preset speed threshold may be set according to the actual situation.

It is worth noting that, when the speed of the vehicle is less than or equal to the preset speed threshold and maintains a preset duration, it may be determined that the driving scenario type represents that the speed of the vehicle is less than or equal to the preset speed threshold, to avoid frequently switching a display mode.

When the driving scenario type represents that the speed of the vehicle is less than or equal to the preset speed threshold, it indicates that the vehicle is in a safe driving environment, the display device may determine the projection display mode as the target display mode, and determine a fourth display content as the target display content. The fourth display content includes an audio and video content. The audio and video content may include a video, a picture, etc. The fourth display content may be include other necessary display content such as a speed, a RPM, a fuel capacity, an electric quantity, in addition to the audio and video content.

In some embodiments, the display device may display the audio and video content based on the projection display mode and a target play progress of the audio and video content.

The target play progress is a progress when the audio and video content is stopped playing last time. The audio and video content may be an audio and video content played when the vehicle was located in the parking scenario last time, and the target play progress may be a play progress when the audio and video content is switched from the parking scenario to a driving scenario.

It is worth noting that, the audio and video content displayed based on the projection display mode and the target play progress of the audio and video content refers to that the display device projects the audio and video content through the project device, and starts playing from the target play progress of the audio and video content.

Thus, when the driving scenario type represents that the vehicle is in the parking scenario, the vehicle may switch to the projection display mode and display the audio and video content, so as to rapidly switch the display of the audio and video content during a parking break, achieve a vehicle viewing effect, and increase a driving pleasure in the vehicle.

Figure 4:
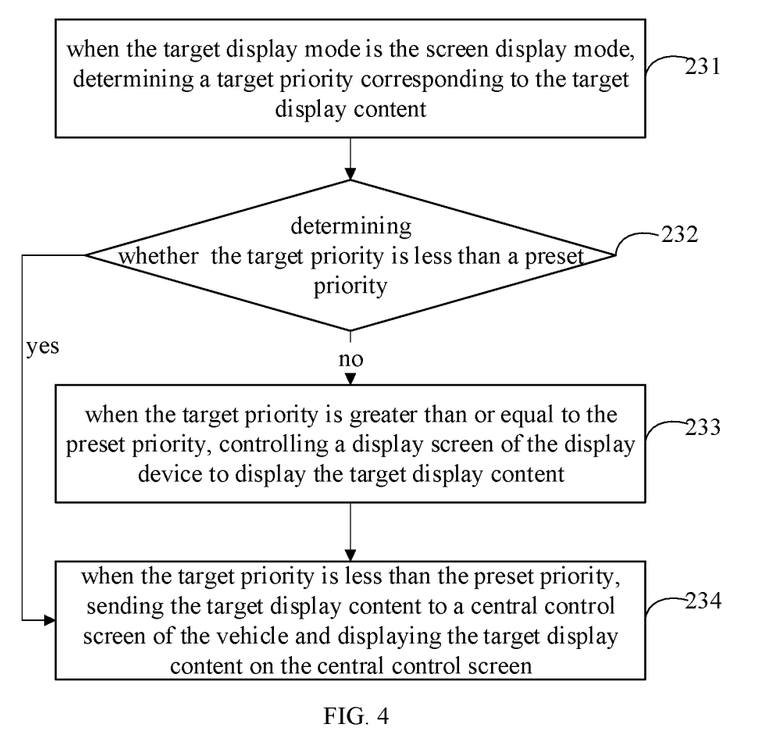
FIG. 4 is a detailed flowchart of step 230 as illustrated in FIG. 2.

FIG. 4 is a detailed flowchart of step 230 as illustrated in FIG. 2. As illustrated in FIG. 4, step 230 may include the following steps.

At step 231, when the target display mode is the screen display mode, a target priority corresponding to the target display content is determined.

When the target display mode is the screen display mode, the display device may determine the target priority corresponding to the target display content based on a preconfigured corresponding relationship between a display content and a priority.

For a different type of display content, a priority may be determined based on a relevance between the type of the display content and driving. The greater the relevance, the higher the priority of the display content, and the less the relevance, the lower the priority of the display content. For example, the priority of the audio and video content may be A, the priority of the vehicle state parameter may be B, the priority of the road condition image may be C, the priority of driving assistance information may be D, and the priority of obstacle information may be E, where a size relationship among the above priorities is A<B<D<E<C.

At step 232, it is determined whether the target priority is less than a preset priority.

The display device determines whether the target priority corresponding to the target display content is less than the preset priority. The preset priority may be set according to the actual condition. When the target priority is less than the preset priority, it proceeds to step 234; when the target priority is greater than or equal to the preset priority, it proceeds to step 233.

At step 233, when the target priority is greater than or equal to the preset priority, a display screen of the display device is controlled to display the target display content.

The target priority is greater than or equal to the preset priority, which indicates that the target display content is a display content highly related to the driving, the target display content with high importance may be displayed on the display screen of the display device, so that the driver may directly view the target display content without lowering his/her head.

At step 234, when the target priority is less than the preset priority, the target display content is sent to a central control screen of the vehicle and displayed on the central control screen.

The target priority is less than the preset priority, which indicates that the target display content is a display content unrelated to the driving. In this case, the display screen of the display device may be configured to display other content with a high priority, so that the target display content with the target priority less than the preset priority may be sent to a central control screen of the vehicle, and displayed on the central control screen.

For example, when the target display content may be an audio and video content, and the target priority corresponding to the audio and video content is less than the preset priority, the audio and video content may be sent to the central control screen of the vehicle and displayed on the central control screen. On the basis of this, the display screen of the display device may be configured to display other content with a high priority, such as a road condition image, obstacle information and a vehicle state parameter.

In some embodiments, the display device may send the audio and video content to the central control screen of the vehicle, and display prompt information on the central control screen. The prompt information is configured to prompt a user about whether the audio and video content is displayed on the central control screen. The audio and video content is displayed on the central control screen when the user selects to display the audio and video content on the central control screen.

Thus, the target display content with the target priority being greater than or equal to the preset priority is displayed on the display screen of the display device, and the target display content with the target priority being less than the preset priority is sent to the central control screen for display, which may not only achieve that the important target display content is displayed on the display screen of the display device, so that the driver may directly view the target display content without lowering his/her head, but also improve a use efficiency of the central control screen.

In some implementations, the display device may include a plurality of display screens, and the plurality of display screens may be configured to provide a screen display mode.

In some implementations, when the target priority is greater than or equal to the preset priority, position information of the plurality of display screens is detected.

A target display screen is determined based on the position information and the target priority. The target display screen is a display screen with a screen priority consistent with the target priority in the plurality of display screens, in which a size of the screen priority is negatively correlated with a distance between the target display screen and the driver cabin. The target display content is displayed on the target display screen.

Taking the plurality of display screens including a first display screen and a second display screen for an example, the display device may check first position information of the first display screen and second position information of the second display screen. The position sensors may be set in the first display screen and the second display screen, and the position sensors may determine the first position information of the first display screen and the second position information of the second display screen.

In other implementations, an inertial measurement unit (IMU) may be set on the display device. When a plurality of display screens are fixed on the display device, the IMU may determine a placement position and a placement angle of the display device on the vehicle, thus determining position information of the plurality of display screens.

It should be understood that, the first position information and the second position information may refer to placement positions and placement angles of the first display device and the second display device in the vehicle.

The display device may determine a target display screen from the plurality of display screens based on the position information of the plurality of display screens and the target priority of the target display content. For example, the display device may determine a target display screen from the first display screen and the second display screen based on the first position information, the second position information and the target priority. The target display screen is a display screen with a screen priority consistent with the target priority in the plurality of display screens. The screen priority refers to a priority for displaying a content in the plurality of display screens, and the higher the screen priority of the display screen, the display screen is configured to display the display content with a higher target priority.

In some embodiments, the size of the screen priority is negatively correlated with the distance between the display screen and the driver cabin. That is, the closer the display screen is to the driver cabin, the higher the corresponding screen priority is. For example, the display screen closest to the driver cabin in the plurality of display screens corresponds to the highest corresponding screen priority. It indicates that the target display screen is a display screen that is placed within a visual range of the driver and closest to the driver's cabin so that the driver may observe it without obstruction.

A screen priority of each display screen at a current placement position may be determined based on the position information of the plurality of display screens, so that the target display screen corresponding to each target display content may be determined based on the screen priority. For example, the priority of the audio and video content may be A, the priority of the vehicle state parameter may be B, the priority of the road condition image may be C, the priority of the driving assistance information may be D, and the priority of the obstacle information may be E, where a size relationship among the above priorities is A<B<D<E<C. The screen priority of the first display screen is 5, and the screen priority of the second display screen is 4. When the target display content includes the obstacle information and the road condition image, the target display screen for displaying the obstacle information is the second display screen, and the target display screen for displaying the road condition image is the first display screen.

When the target display screen is determined, the display device controls the target display screen to display the target display content.

It should be understood that, for display screens other than the target display screen, an existing display content may be maintained. For example, when the second display screen is the target display screen, the target display content is displayed on the second display screen. For the first display screen, the existing display content is maintained. That is, display contents of the first display screen and the second display screen may be controlled independently.

Thus, the target display screen is determined based on the position information of the plurality of display screens and the target priority, and the target display content is displayed on the target display screen, so that the driver may quickly view the target display content on the target display without not affecting contents of other display screens.

A computer-readable storage medium storing a computer program instruction is further provided in the present disclosure. The program instruction implements steps of the method for controlling a display device of a vehicle according to the present disclosure when executed by a processor.

As illustrated in FIG. 1, a display device is further provided in the embodiments of the present disclosure. The display device includes a projection device 110, a display screen 120, a communicator 130, a memory 140 and a controller 150.

The projection device 110 is configured to provide a projection display mode.

The display screen 120 is configured to provide a screen display mode.

The communicator 130 is configured to communicate with an external terminal.

The memory 140 is configured to store instructions executable by the controller.

The controller 150 is configured to implement steps in the method for controlling the display device of the vehicle according to the present disclosure by executing the instructions.

In some embodiments, there may be a plurality of display screens 120. For example, the display screen 120 may include a first display screen and a second display screen.

After considering the specification and practicing the disclosure herein, those skilled in the art will easily think of other implementations. The description and the embodiments are to be regarded as exemplary only, and the true scope of the present disclosure are given by the appended claims.

It should be understood that the present disclosure is not limited to the precise structure described above and shown in the drawings. The scope of the present application is only limited by the appended claims.

What is claimed is:

1. A method for controlling a display device of a vehicle, wherein the display device is configured to acquire data information sent by an external terminal by communicating with the external terminal, the display device comprises a display screen and a projection device, and the display device is fixed on a central control screen of the vehicle, the method comprising:
   acquiring a driving parameter collected by the vehicle;
   determining a current driving scenario type of the vehicle based on the driving parameter;
   in response to the current driving scenario type of the vehicle representing a complex road condition based on the driving parameter, determining a screen display mode as a target display mode, and controlling the display screen to display a target display content; and
   in response to the current driving scenario type representing that a road condition safety level is greater than a preset level, determining a projection display mode as the target display mode, and controlling the projection device to display the target display content in the projection display mode.

2. The method according to claim 1, wherein the driving parameter comprises light intensity information,
   wherein determining the current driving scenario type of the vehicle based on the driving parameter comprises:
   in response to the light intensity information meeting a preset condition, determining that the current driving scenario type of the vehicle is a first driving scenario, wherein the preset condition comprises a difference value between a light intensity of a first region of the vehicle and a light intensity of a second region of the vehicle being greater than a first preset threshold; and
determining the target display mode comprises:
in response to the current driving scenario type being the first driving scenario, determining the screen display mode as the target display mode, wherein the target display content comprises a road condition image collected by the vehicle.

3. The method according to claim 1, wherein the driving parameter comprises obstacle information,
wherein determining the current driving scenario type of the vehicle based on the driving parameter comprises:
in response to the obstacle information representing that a number of obstacles is greater than a second preset threshold, determining that the current driving scenario type of the vehicle is a second driving scenario; and
determining the target display mode comprises:
in response to the current driving scenario type being the second driving scenario, determining the screen display mode as the target display mode, wherein the target display content comprises the obstacle information collected by the vehicle.

4. The method according to claim 1, wherein determining the target display mode comprises:
in response to the current driving scenario type representing that the vehicle is located in a highway driving scenario and a number of obstacles is less than a third preset threshold, determining the projection display mode as the target display mode, wherein the target display content comprises driving assistance information for alleviating driving fatigue.

5. The method according to claim 1, wherein determining the target display mode comprises:
in response to the current driving scenario type representing that a speed of the vehicle is less than or equal to a preset speed threshold, determining the screen display mode as the target display mode, wherein the target display content comprises an audio and video content.

6. The method according to claim 5, wherein displaying the target display content comprises:
displaying the audio and video content based on the projection display mode and a target play progress of the audio and video content, wherein the target play progress is a progress when the audio and video content stopped playing last time.

7. The method according to claim 1, wherein displaying the target display content comprises:
in response to the target display mode being the screen display mode, determining a target priority corresponding to the target display content;
in response to the target priority being greater than or equal to a preset priority, controlling the display screen of the display device to display the target display content; and
in response to the target priority being less than the preset priority, sending the target display content to the central control screen of the vehicle and displaying the target display content on the central control screen.

8. The method according to claim 7, wherein the display device comprises a plurality of display screens,
wherein in response to the target priority being greater than or equal to the preset priority, controlling the display screen of the display device to display the target display content comprises:

in response to the target priority being greater than or equal to the preset priority, detecting position information of the plurality of display screens;
determining a target display screen based on the position information and the target priority among the plurality of display screens, wherein a screen priority of the target display screen is consistent with the target priority, and a size of the screen priority is negatively correlated with a distance between the target display screen and a driver cabin; and
displaying the target display content on the target display screen.

9. A display device of a vehicle, the display device being fixed on a central control screen of the vehicle, the display device comprising:
a projection device configured to provide a projection display mode;
a display screen configured to provide a screen display mode;
a communicator configured to communicate with an external terminal and acquire data information sent by the external terminal;
a memory configured to store instructions executable by a controller; and
the controller, configured to:
acquire a driving parameter collected by the vehicle;
determine a current driving scenario type of the vehicle based on the driving parameter;
in response to the current driving scenario type of the vehicle representing a complex road condition based on the driving parameter, determine a screen display mode as a target display mode, and control the display screen to display a target display content; and
in response to the current driving scenario type representing that a road condition safety level is greater than a preset level, determine a projection display mode as the target display mode, and control the projection device to display the target display content in the projection display mode.

10. The display device according to claim 9, wherein the driving parameter comprises light intensity information, and the controller is further configured to:
in response to the light intensity information meeting a preset condition, determine that the current driving scenario type of the vehicle is a first driving scenario, wherein the preset condition comprises a difference value between a light intensity of a first region of the vehicle and a light intensity of a second region of the vehicle being greater than a first preset threshold; and
in response to the current driving scenario type being the first driving scenario, determine the screen display mode as the target display mode, and determine a first display content as the target display content, wherein the first display content comprises a road condition image collected by the vehicle.

11. The display device according to claim 9, wherein the driving parameter comprises obstacle information, and the controller is further configured to:
in response to the obstacle information representing that a number of obstacles is greater than a second preset threshold, determine that the current driving scenario type of the vehicle is a second driving scenario; and
in response to the current driving scenario type being the second driving scenario, determine the screen display mode as the target display mode, and determine a second display content as the target display content, wherein the second display content comprises the obstacle information collected by the vehicle.

12. The display device according to claim 9, wherein the controller is further configured to:
in response to the current driving scenario type representing that the vehicle is located in a highway driving scenario and a number of obstacles is less than a third preset threshold, determine the projection display mode as the target display mode, and determine a third display content as the target display content, wherein the third display content comprises driving assistance information for alleviating driving fatigue.

13. The display device according to claim 9, wherein the controller is further configured to:
in response to the current driving scenario type representing that a speed of the vehicle is less than or equal to a preset speed threshold, determine the screen display mode as the target display mode, and determine a fourth display content as the target display content, wherein the fourth display content comprises an audio and video content.

14. The display device according to claim 13, wherein the controller is further configured to:
control the projection device to display the audio and video content based on the projection display mode and a target play progress of the audio and video content, wherein the target play progress is a progress when the audio and video content stopped playing last time.

15. The display device according to claim 9, wherein the controller is further configured to:
in response to the target display mode being the screen display mode, determine a target priority corresponding to the target display content;
in response to the target priority being greater than or equal to a preset priority, control the display screen to display the target display content; and
in response to the target priority being less than the preset priority, send the target display content to a central control screen of the vehicle and control the central control screen to display the target display content.

16. The display device according to claim 15, wherein the display device comprises a plurality of display screens, and the controller is further configured to:
determine a target display screen among the plurality of display screens based on position information of the plurality of display screens and the target priority, wherein the position information is detected in response to the target priority being greater than or equal to the preset priority, a screen priority of the target display screen is consistent with the target priority, and a size of the screen priority is negatively correlated with a distance between the target display screen and a driver cabin; and
control the target display screen to display the target display content.

17. A non-transitory computer-readable storage medium with a computer instruction stored thereon, wherein when the computer instruction is executed by a processor, a method for controlling a display device of a vehicle is implemented, wherein the display device is configured to acquire data information sent by an external terminal by communicating with the external terminal, the display device comprises a display screen and a projection device, and the display device is fixed on a central control screen of the vehicle, the method comprising:
acquiring a driving parameter collected by the vehicle;
determining a current driving scenario type of the vehicle based on the driving parameter;
in response to the current driving scenario type of the vehicle representing a complex road condition based on the driving parameter, determining a screen display mode as a target display mode, and controlling the display screen to display a target display content; and
in response to the current driving scenario type representing that a road condition safety level is greater than a preset level, determining a projection display mode as the target display mode, and controlling the projection device to display the target display content in the projection display mode.

* * * * *